June 12, 1973     P. J. BECHTEL     3,738,847

PROCESS FOR PRODUCING A CANNED EGG IN MEAT PET FOOD

Filed April 23, 1971

INVENTOR:
PETER J. BECHTEL

By    Donnie Rudd
Attorney

United States Patent Office 3,738,847
Patented June 12, 1973

3,738,847
PROCESS FOR PRODUCING A CANNED EGG IN MEAT PET FOOD
Peter J. Bechtel, East Lansing, Mich., assignor to The Quaker Oats Company, Chicago, Ill.
Filed Apr. 23, 1971, Ser. No. 136,754
Int. Cl. A22c 18/00; A23b 1/00
U.S. Cl. 99—187　　　　　　　　　　　　　　　1 Claim

ABSTRACT OF THE DISCLOSURE

A process is disclosed for producing an egg in meat pet food wherein a container is partially filled with a ground meat mixture, a tube is inserted into the ground meat mixture, an egg mixture is passed through the tube until the container is filled while at all times maintaining a layer of ground meat mixture between the egg mixture and the container, removing the tube from the container, sealing the container, and heating the sealed container to sterilize the ground meat mixture and egg mixture.

A new product is described comprising in combination a center core of a sterilized egg mixture, a surrounding medium of a sterilized ground meat mixture which completely surrounds the sterilized egg mixture and a container which contains the ground meat mixture and which is hermetically sealed.

BACKGROUND OF THE INVENTION

Field of the invention

This invention relates to a pet food of the hash type which contains eggs in the mixture. More specifically, this invention relates to an egg in meat pet food.

Description of the prior art

The nutritional requirements of a dog are based on several factors including the size of the dog and the environment in which he lives. Although most commercial dog foods provide the basic calorie need, many such products could be improved by inclusion of additional protein therein.

A high quality protein diet has been found desirable for dogs. The use of eggs in their diet has long been advised by nutritionists for several reasons. Eggs contain an excellent balance of amino acids essential to growth and maintenance. Egg protein is helpful in providing the nitrogen equilibrium in the adult dog. It is assumed that egg protein supplies the indispensable amino acids in approximately the equilibrium amounts for the metabolic needs of the body. Therefore, there is a demonstrated advantage for providing a dog food containing significant quantities of eggs.

The concept of using eggs in dog food is not new. For instance, the idea is fairly well discussed in U.S. Pat. No. 3,561,972 wherein citric acid is used to accomplish the blending of eggs with meat. I have found, however, that all of the known processes for producing an egg and meat pet food left something to be desired. Usually it is found that the egg either has some reaction with the standard can or else discolors when it come in contact with the standard can. All known commercial processes for producing an egg and meat pet food product have attempted to overcome this problem by placing some additive in either the meat or egg to prevent discoloring. I have found that I can overcome this problem without the use of additives simply by maintaining a layer of meat between the egg and the container at all times.

SUMMARY OF THE INVENTION

It is an object of this invention to produce a process for producing an egg and meat pet food.

It is another object of this invention to produce a new and novel product of the egg and meat variety.

The objects of this invention are accomplished by a process for producing an egg and meat pet food comprising partially filling a container with a ground meat mixture, inserting a tube into the ground meat mixture, passing an egg mixture through the tube until the container is filled while at all times maintaining a layer of ground meat mixture between the egg mixture and the container, removing the tube from the container, sealing the container, and heating the sealed container to sterilize the ground meat mixture and egg mixture.

The objects of this invention are further accomplished by the product comprising in combination a center core of a sterilized egg mixture, a surrounding medium which completely surrounds the center core, said surrounding medium comprising a sterilized ground meat mixture and a container containing the sterilized ground meat mixture, said container being hermetically sealed.

I have found that it is desirable in my process to fill a typical can about three-fourths of the way full with a proper meat mixture then insert a tube about one-fourth of the way from the bottom of the can and inject egg into the ground meat mixture while slowly pulling the tube out of the can until the container is full. At this point the ground meat mixture completely encloses the egg mixture and the can can be sealed and retorted to sterilize its contents.

BRIEF DESCRIPTION OF THE DRAWING

This invention may be more fully described but should not be limited by the accompanying drawings wherein I have used FIG. 1 to illustrate an empty can 11 sitting atop a platform 12 ready to be filled.

DESCRIPTION OF THE PREFERRED EMBODIMENTS

Figure 1:
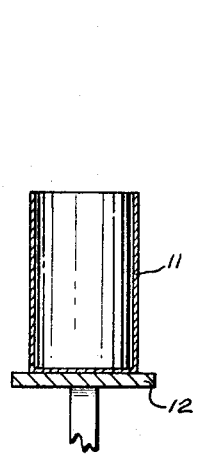
Figure 2:
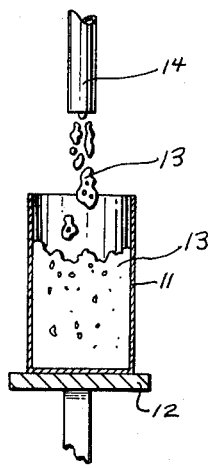
FIG. 2 illustrates the same can being filled about three-fourths capacity with a ground meat product 13 from a standard filling device 14.
Figure 3:
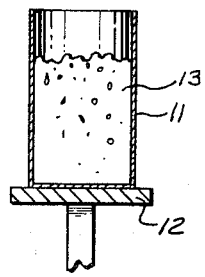
FIGS. 3 and 4 illustrate the same can approximately three-fourths of the way full as it passes down the processing line.
Figure 4:
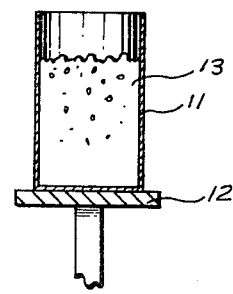
Figure 5:
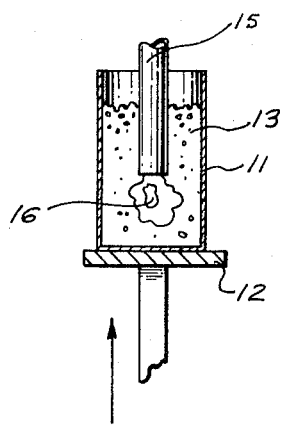
In FIG. 5 the can has moved underneath a filling tube 15 and the platform 12 has been raised until the tube exit is in the mid portion of the ground meat 13. At this point an egg mixture 16 is injected into the ground meat.
Figure 6:
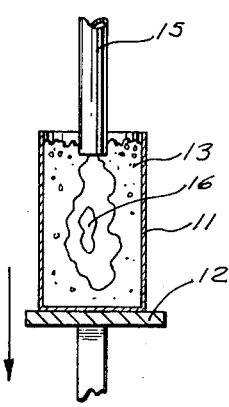
In FIG. 6 it is illustrated that the platform is lowered as the egg is injected causing the egg to fill the center portion of the ground meat mixture and thereby causing the ground meat mixture to rise to the top of the can.
Figure 7:
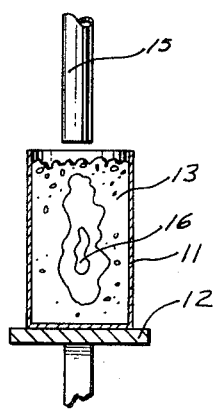
In FIG. 7 the egg supply tube has been removed and the can is shown in its returned position substantially filled with ground meat mixture which completely encircles the injected egg mixture; and In FIG. 8 a lid 17 has been placed on the can to hermetically seal it and the can is then passed to retorting.
Figure 8:
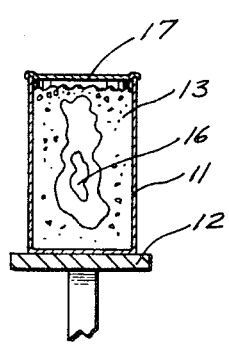

The following example more clearly illustrates the process and product of my invention.

A ground meat mixture was prepared by admixing 45 parts by weight water, 9 parts by weight ground bone, 5 parts by weight ground horsemeat, 5 parts by weight ground chicken, 10 parts by weight meat by-products (spleen, lungs, gullet) and typical vitamins and minerals commonly added to pet food. The mixture was thoroughly mixed and ground until it would pass through a ⅜ inch plate. The mixture was next heated until the meat therein was substantially cooked.

An egg mixture was prepared by admixing 5 parts by weight dried egg, 0.3 part by weight vegetable gum, 15 parts by weight water. This mixture was slurried together at a temperature between 70° F. and 80° F. The mixtures were then conveyed to the appropriate portions of the apparatus as shown in the accompanying drawing. A can was filled about nine-tenths full with about 9 parts by weight of the ground meat mixture and a tube was inserted into the can and 1 part by weight of the egg mixture was inserted therethrough to fill the can. The can was then sealed and retorted at about 276° F. for three-fourths hour.

It is to be understood that the egg to ground meat ratio is left to the discretion of the processor, but I prefer a product having a major portion thereof of meat. It is also to be understood that any of the common meaty pet food mixtures may be used as the meat of this invention including prepared ground meat by itself. It is also to be understood that any of the commonly used egg mixtures may be used in this invention.

It is also to be understood that the times and temperatures used in the canning procedure as well as the sealing of the can are standard to the pet food industry and may be altered within standard commercial usage.

The process of this invention is new and unique and provides an extremely simple procedure for producing a new and unique product. The process utilizes a simple procedure to avoid the expense and irritation of having to supply costly additives to a product. The product is an extremely pleasing and nutritional product for pet food consumption.

Having fully described this new and unique invention, I claim:

1. A process for producing a canned egg in meat pet food comprising partially filling a can with a ground meat mixture, inserting a tube into the ground meat mixture, passing an egge mixture slurry through the tube until the can is filled while at all times maintaining a layer of the ground meat mixture between the egg mixture and the can, removing the tube from the can, sealing the can, and heating the sealed can to sterilize the ground meat mixture and egg mixture whereby a layer of ground meat maintains the egg mixture out of direct contact with the can thus preventing any discoloration of said mixture.

References Cited

UNITED STATES PATENTS

| | | | |
|---|---|---|---|
| 3,561,972 | 2/1971 | Dodge et al. | 99—113 X |
| 609,799 | 8/1898 | Flinn | 99—256 |
| 2,937,092 | 5/1960 | Zitin | 99—108 X |
| 3,285,749 | 11/1966 | Shires | 99—113 |

FOREIGN PATENTS

| | | | |
|---|---|---|---|
| 341,760 | 1/1931 | Great Britain | 99—108 |
| 442,644 | 2/1936 | Great Britain | 99—109 |
| 442,645 | 2/1936 | Great Britain | 99—109 |

OTHER REFERENCES

Lord, "Everybody's Cookbook," 1937, Published by Harcourt, Brace and Co., New York, pp. 482, 483, 845, article entitled Meat Loaf No. 1.

HYMAN LORD, Primary Examiner

U.S. Cl. X.R.

99—108, 113